(12) United States Patent
Eckart

(10) Patent No.: US 9,366,363 B2
(45) Date of Patent: Jun. 14, 2016

(54) BUSHING FOR COUPLING WITH A COMPONENT

(71) Applicant: Liebherr-Aerospace Lindenberg GmbH, Lindenberg/Allgäu (DE)

(72) Inventor: Martin Eckart, Simmerberg (DE)

(73) Assignee: Liebherr-Aerospace Lindenberg GmbH, Lindenberg/Allgäu (DE)

( * ) Notice: Subject to any disclaimer, the term of this patent is extended or adjusted under 35 U.S.C. 154(b) by 0 days.

(21) Appl. No.: 13/856,767

(22) Filed: Apr. 4, 2013

(65) Prior Publication Data

US 2014/0150205 A1 Jun. 5, 2014

(30) Foreign Application Priority Data

Apr. 5, 2012 (DE) .......................... 10 2012 007 010

(51) Int. Cl.
| | | |
|---|---|---|
| *F16L 5/10* | (2006.01) | |
| *F16L 5/00* | (2006.01) | |
| *F16C 35/02* | (2006.01) | |
| *F16C 33/08* | (2006.01) | |
| *B23P 11/00* | (2006.01) | |

(52) U.S. Cl.
CPC ............... *F16L 5/00* (2013.01); *B23P 11/005* (2013.01); *F16C 33/08* (2013.01); *F16C 35/02* (2013.01); *F16L 5/10* (2013.01); *Y10T 16/05* (2015.01); *Y10T 29/49995* (2015.01)

(58) Field of Classification Search
CPC ............. F16L 5/10; F16B 13/14; D07B 1/18; B29C 66/474; F16C 35/02; F16C 33/08
USPC ...................................................... 16/2.1–2.5
See application file for complete search history.

(56) References Cited

U.S. PATENT DOCUMENTS

| | | | | | |
|---|---|---|---|---|---|
| 914,705 | A | * | 3/1909 | Donnelly et al. ................. | 16/2.1 |
| 1,226,090 | A | * | 5/1917 | Ludlum ........................... | 16/2.3 |
| 1,297,142 | A | * | 3/1919 | Gibbons ......................... | 16/2.1 |
| 1,481,217 | A | * | 1/1924 | Maloy ............................. | 16/2.1 |
| 2,327,656 | A | * | 8/1943 | Meek .............................. | 16/2.4 |
| 2,385,294 | A | * | 9/1945 | Lowy ............................. | 16/2.3 |
| 2,583,719 | A | * | 1/1952 | White ............................. | 16/2.1 |
| 2,901,800 | A | * | 9/1959 | Koehl ............................. | 16/2.1 |
| 3,314,138 | A | | 4/1967 | Double | |
| 3,399,435 | A | * | 9/1968 | Ackerman, Jr. ................. | 16/2.1 |
| 7,380,315 | B1 | * | 6/2008 | Jung ............................... | 16/2.1 |
| 8,037,578 | B2 | * | 10/2011 | Megason ......................... | 16/2.1 |

FOREIGN PATENT DOCUMENTS

| | | | |
|---|---|---|---|
| DE | 19950719 | A1 | 5/2001 |
| EP | 1717460 | A1 | 11/2006 |

* cited by examiner

*Primary Examiner* — Jeffrey O Brien
(74) *Attorney, Agent, or Firm* — Dilworth & Barrese, LLP

(57) ABSTRACT

This invention relates to a bushing for coupling with a component and a method for avoiding a relative movement between the bushing and the component. The bushing includes a form-fit means which is integrally formed with the bushing. The form-fit means is deformed such that after a deformation the form-fit means is in positive connection with the component, so that a relative movement between the bushing and the component is prevented.

8 Claims, 4 Drawing Sheets

BUSHING FOR COUPLING WITH A COMPONENT

BACKGROUND OF THE INVENTION

This invention relates to a bushing for coupling with a component and a method for avoiding a relative movement between the bushing and the component coupled with the bushing.

From the prior art, a multitude of different types of bushing are known. The bushings can be inserted into a component or be put onto a component. The attachment of the bushings to the components should be effected such that there is no relative movement between the bushing and the component. A relative movement between the bushing and the component can be caused by pulsating or alternating loads of the bushing and/or the component. Bushings which move at the joint lead to an increased wear at the joint or, when corrosive materials are used, very frequently to an increased corrosion at the joint. Various methods are known already, by means of which the joining force between the bushing and the component is increased, in order to prevent the aforementioned relative movement.

It is known, for example, that bushings for the wear protection or corrosion protection of components are inserted thermally. In view of the temperature difference between the bushing and the component before joining, the joining force is limited to the due to the technical constraints. In addition, a disadvantage of the thermal joining method consists in that the achievable joining force is not sufficient to safely prevent rotating or migrating of the bushing under the extended influence of a pulsating or alternating load in operation.

Furthermore it is known to press the bushing into a component or onto a component by means of a hydraulic device. In this method it is, however, disadvantageous that a device for pressing the bushing, which is especially formed for this purpose, is required.

Furthermore, it is known that the bushing can be glued to the component. With this fastening method, however, only small joining forces can be achieved, so that the field of application of the fastening method remains limited to cases of application of the bushing in which no high loads act on the same.

SUMMARY OF THE INVENTION

The object of the invention consists in providing a bushing which at least does not have the disadvantages mentioned above. Furthermore, an object consists in providing a method for avoiding a relative movement between the bushing and the component, which at least does not have the disadvantages mentioned above.

This object is solved by the subject-matter and method herein. Advantageous aspects of the invention are also the subject-matter herein.

According to the invention a bushing, in particular a bearing bush, is provided, which can be coupled with a component and includes at least one form-fit means. The at least one form-fit means is formed integrally with the bushing and can be made of the same material as the bushing. The form-fit means is manufactured by machining the bushing. To avoid a relative movement between the bushing and the component the form-fit means is deformed, in particular shaped, and brought in positive connection with the component.

Such type of bushing has the advantage that due to the positive connection between the bushing and the component, the risk of a relative movement between the bushing and the component due to pulsating or alternating loads is reduced significantly. In particular, in combination with the above-mentioned thermal installation method, the joining force between the bushing and the component is increased, so that migrating of the bushing is prevented.

Another advantage of the aforementioned bushing consists in that the form-fit means can be manufactured easily and without providing a hydraulic device. For example, the form-fit means on the bushing can be manufactured by means of a mortising method or a curling method. In the sense of the invention, mortising method is understood to be a method in which the form-fit means is manufactured by a caulking tool. In the mortising method, a simultaneous deformation of the bushing, in particular of the form-fit means, can be realized around the entire circumference. In the sense of the invention, curling method is understood to be a method in which the form-fit means is manufactured by a curling tool.

In a preferred embodiment, the bushing can have a bushing body and a head portion which extends transversely, in particular vertically, from the bushing body. The form-fit means can be formed integrally with the bushing body and/or the head portion. In particular, the form-fit means can be provided at an end of the bushing body facing away from the head portion. The head portion can be formed integrally with the bushing body. Providing a bushing with a head portion offers the advantage that when coupling the bushing with the component, the head portion itself serves to avoid a relative movement between the bushing and the component in at least one direction, in particular in a longitudinal direction of the bushing. The head portion and/or the bushing body can directly be coupled with the component.

Before machining the bushing, in particular manufacturing the form-fit means, the bushing can be put onto a component or be inserted into a component. This offers the advantage that after the machining operation and the deforming operation in particular a plastic deforming operation, such as deforming the form-fit means, no further working steps are necessary.

When manufacturing the form-fit means, a groove can be formed into the bushing. Alternatively or in addition, a side of the bushing facing away from the head portion can be chamfered. In addition, chamfering can be effected on a side facing away from the component. The groove can be produced on an end face of the bushing. Forming a groove in the bushing and/or chamfering a side of the bushing offers the advantage that the form-fit means can slightly be deformed for producing a positive connection. The bushing body is that part of the bushing which is not machined when producing the form fit-means.

The form-fit means can be formed as a protruding portion. In particular, the form-fit means can be formed as a portion protruding from the bushing body and/or from the head portion. Furthermore, a cutout counterformed to the form-fit means can be produced in the component, into which the form-fit means can penetrate. This offers the advantage that the risk of a relative movement between the bushing and the component is further reduced.

For producing and deforming the form-fit means, the same machining apparatus and/or the same tool can be used. Among other things, the machining apparatus serves for holding the tool. This offers the advantage that the manufacturing operation of the form-fit means on the bushing is effected quickly and hence at low cost. For example, when manufacturing the bushing with the mortising method or the curling method, the caulking tool or the curling tool can be utilized for deforming the form-fit means. For this purpose, a force can be exerted on the form-fit means by the tool in direction of the component.

The bushing can be put onto a component or be inserted into a component. In the following, the bushing which is put onto a component, such as a pin, mandrel, shaft or the like, is referred to as external bushing and the bushing which is inserted into a component is referred to as internal bushing. Correspondingly, the deforming direction of the form-fit part depends on whether the bushing is an external or an internal bushing. In both cases, the form-fit means is deformed, in particular bent, in direction of the component.

The bushings can be made of various materials and can be used for various purposes, such as for wear protection, corrosion protection or repair methods of load introduction points or fastening points between various components.

With the present invention, the longitudinal movement is prevented by positive connection and the relative movement is prevented by frictional connection. Finally, an existing clearance can be compensated.

BRIEF DESCRIPTION OF THE DRAWINGS

Further details and advantages of the invention will now be explained in detail with reference to the exemplary embodiments illustrated in the drawings.

In the drawings.

DESCRIPTION OF THE PREFERRED EMBODIMENTS

Figure 1:
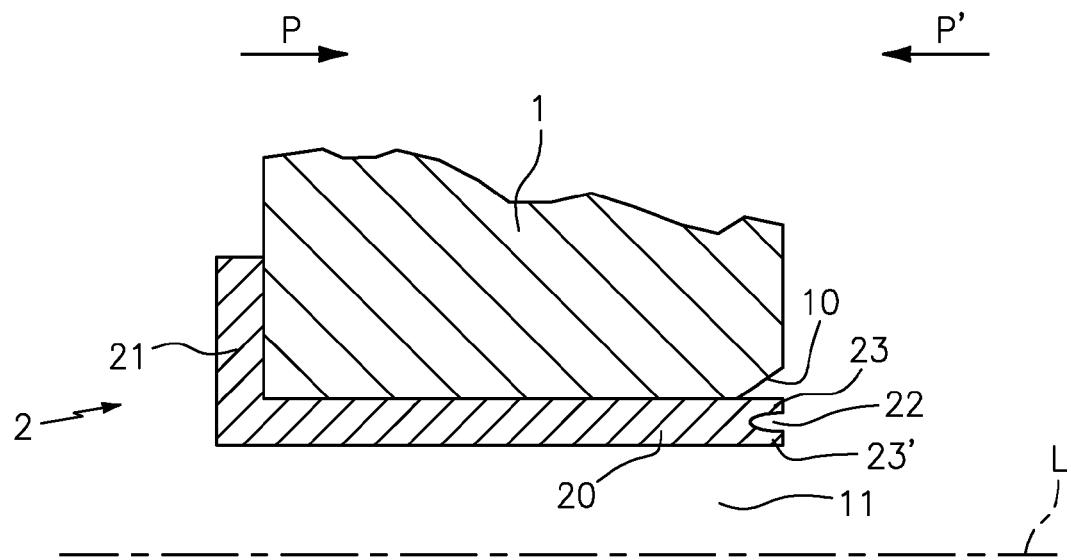
FIG. 1 shows a bushing according to the invention coupled with a component before a deforming operation of the form-fit means according to a first embodiment.

The bushing 2 according to a first embodiment as shown in FIG. 1 is coupled with a component 1. In particular, the bushing 2 in part is inserted into a recess 11 of the component 1. The bushing 2 includes a head portion 21 and a bushing body 20. The head portion 21 substantially extends vertically from the bushing body 20 and is in contact with the component 1. The bushing body 20 likewise is in contact with the component 1. By providing the head portion 21 and by the direct contact of the head portion 21 with the component 1, a bushing movement in longitudinal direction P' of the bushing 2 is prevented.

At its end facing away from the head portion 21 the bushing 2 includes two form-fit means in the form of two protruding portions 23, 23'. The two form-fit means are separated from each other by a groove 22 and protrude from the bushing body 20. The groove 22 extends from the end face of the bushing 2 in direction of the head portion 21. The bushing body 20 is regarded as that part of the bushing 2 which is not machined, i.e. the part in which no removal of material has been effected when making the groove 22. In the component 1 a cutout 10 is provided, which is counterformed to the form-fit means or to the protruding portion 23, 23'.

FIG. 1 shows a condition in which no deformation of the protruding portion 23, 23' is effected. This means that the bushing 2 still can move in a longitudinal direction P' of the bushing 2, wherein the movement in longitudinal direction P is directed opposite to the movement in longitudinal direction P'.

Figure 2:
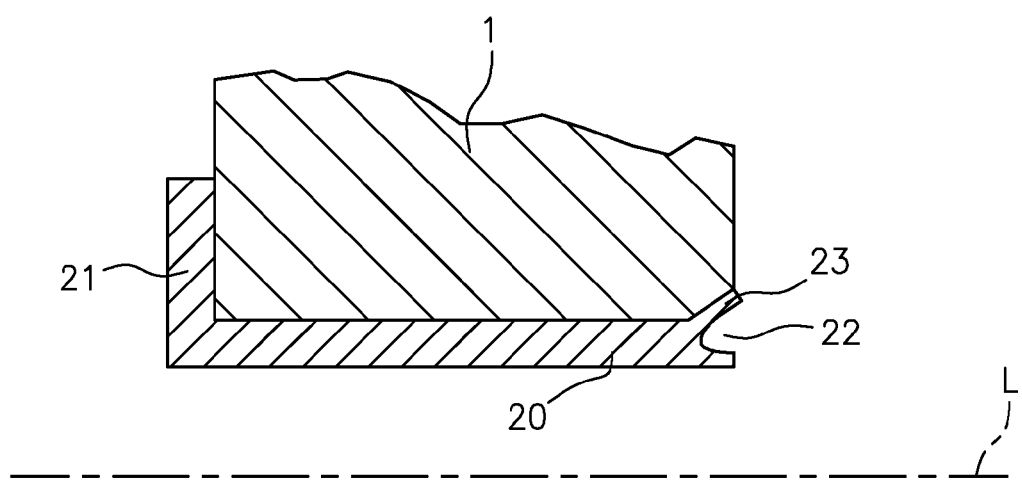
FIG. 2 shows a bushing according to the invention coupled with the component after a deforming operation of the form-fit means according to a first embodiment.

FIG. 2 shows a condition in which a deformation of the form-fit means has been effected. The form-fit means or the protruding portion 23 located closer to the component 1 is shaped such that the same penetrates into the cutout 10 and gets in contact with the component 1. As a result, a position connection between the bushing 2 and the component 1 is achieved by shaping. By deforming the form-fit means and the protruding portion 23 and the resulting contacting of the protruding portion 23 with the component 1, a movement of the bushing in longitudinal direction P' and a rotary movement can be prevented. At the same time, a movement of the bushing 2 in a direction transverse to a longitudinal axis L of the bushing 2 can be prevented by contacting the component 1 with the head portion 21 and the form-fit means.

Figure 3:
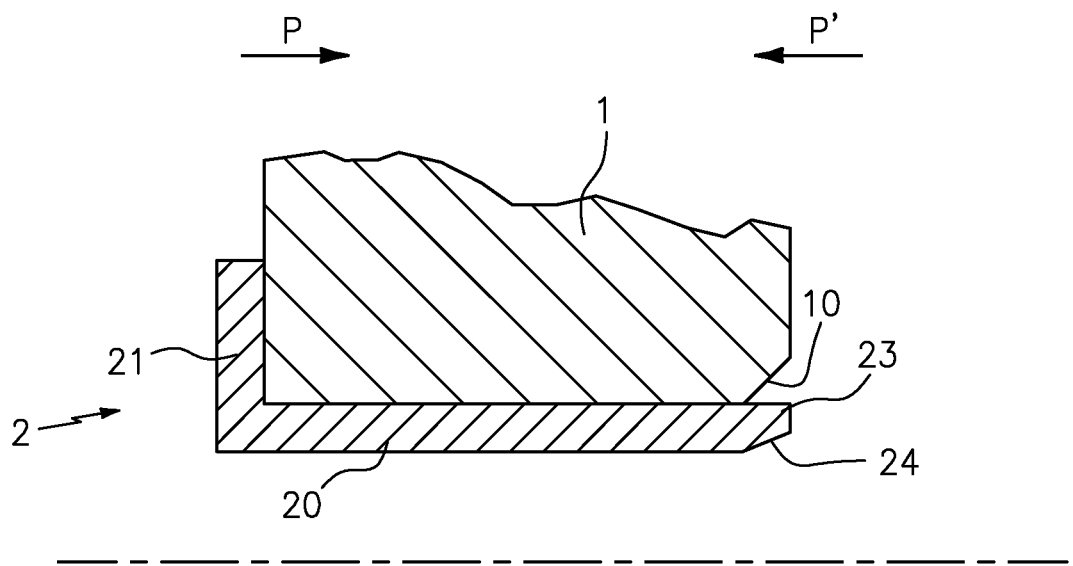
FIG. 3 shows a bushing according to the invention coupled with a component before a deforming operation of the form-fit means according to a second embodiment.
Figure 4:
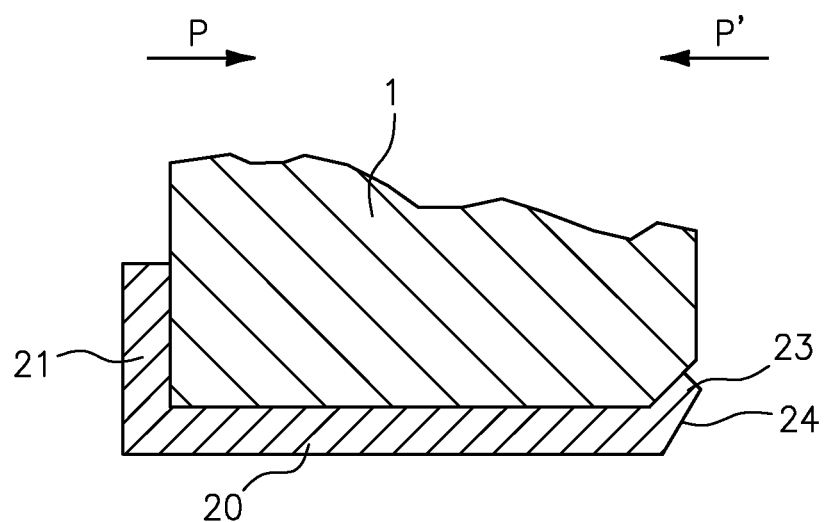
FIG. 4 shows a bushing according to the invention coupled with the component after a deforming operation of the form-fit means according to a second embodiment.

In FIGS. 3 and 4 a bushing 2 according to a second embodiment is shown. FIG. 3 shows a condition in which the form-fit means is not deformed, and FIG. 4 shows a condition in which the form-fit means is deformed. The bushing 2 according to the second embodiment differs from the bushing according to the first embodiment in the formation of the form-fit means.

In the bushing 2 according to the second embodiment, only a single form-fit means is formed in the form of a portion 23 protruding from the bushing body 20. The form-fit means is formed by chamfering a side of the bushing 2 remote from the head portion. In particular, that side of the bushing 2 is chamfered which is provided at the end remote from the head portion 21 and on a side of the bushing body 20 facing away from the component 1. The form-fit means protrudes from the bushing body 20. In this case, too, that portion of the bushing 2 is regarded as bushing body 20, from which no material is removed during the chamfering operation.

In the condition shown in FIG. 3 a movement of the bushing 2 in longitudinal direction P' is possible. On the other hand, in the condition shown in FIG. 4 a movement of the bushing 2 in longitudinal direction P' is not possible, since the form-fit means 23 is deformed. A rotary movement also is prevented. In particular, the form-fit means 23 is deformed such that it penetrates into the cutout 10 and gets in contact with the component 1, whereby a positive connection between the bushing 2 and the component 1 is produced. In this position of the form-fit means, a movement of the bushing 2 in longitudinal direction P' of the bushing 2 is avoided.

Figure 5:
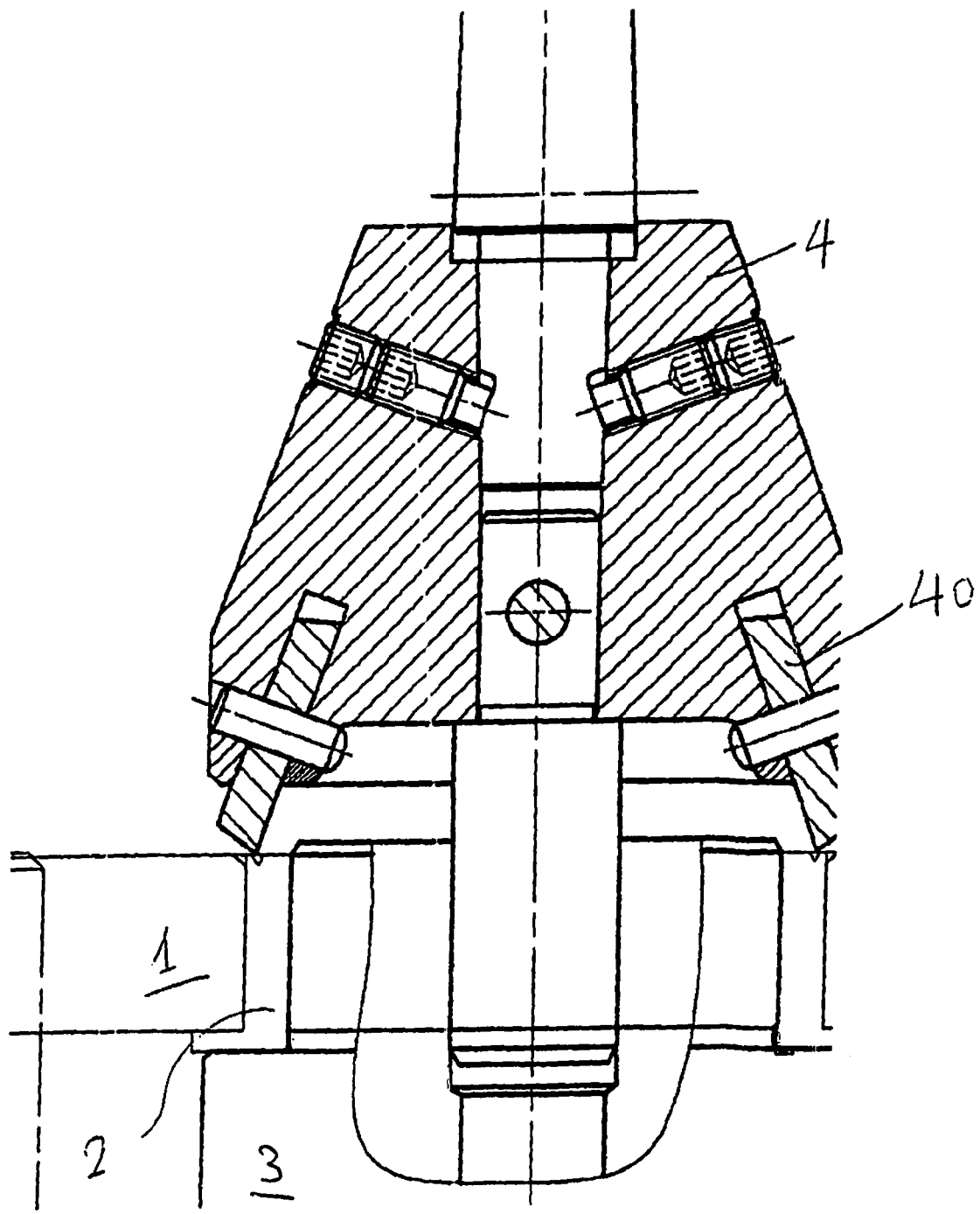
FIG. 5 shows an apparatus for carrying out a curling method.
Figure 6:
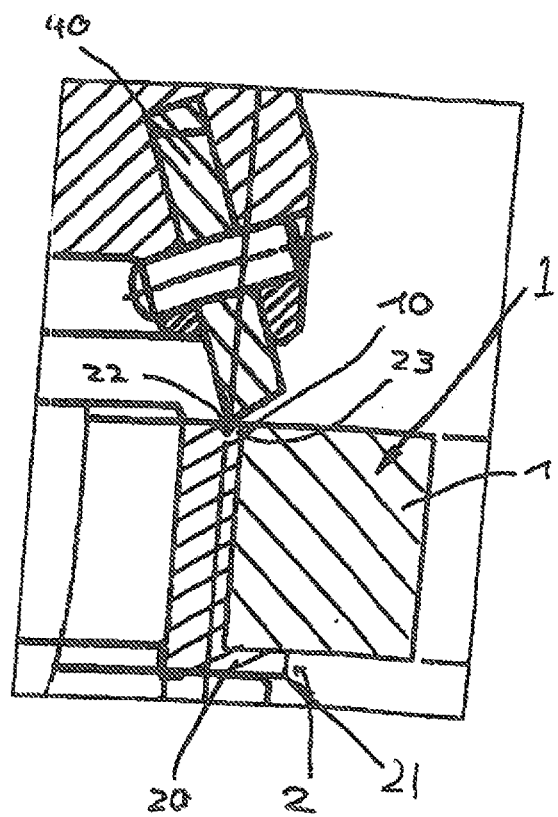
FIG. 6 shows an enlarged portion of the apparatus shown in FIG. 5

FIG. 5 shows a machining apparatus for carrying out the curling method. FIG. 6 shows an enlarged portion of the engagement region of the apparatus tool with the bushing. The machining apparatus includes a carrier 3 for carrying the bushing 2 and the component 1. Furthermore, the machining apparatus includes a tool holder 4 which holds a tool 40. The tool 40 can rotate about an axis of rotation and also perform a lifting movement along a longitudinal axis of the machining apparatus. The tool holder can be a drill press.

In the following, the operation of joining the bushing 2 with the component 1 will be explained. In the component 1, the cutout 10 is produced before the coupling operation with the bushing 2. This can be effected by the machining apparatus shown in FIG. 5 or by another apparatus. Subsequently, coupling of the bushing 2 with the component 1 is effected. For this purpose, the bushing 2 is inserted into the cutout 11 of the component. After the inserting operation, the groove 22 and hence the form-fit means is produced in the bushing 2 by means of the tool 40.

In the final analysis, a force is exerted by the tool 40 in direction of the head portion 20 of the bushing, so that the form-fit means or the protruding portion 23 is deformed. The form-fit means is bent and penetrates into the cutout 10 of the component 1 and gets in contact with the same, whereby a positive connection between the bushing 2 and the component 1 is produced. Subsequent to the deforming operation, the bushing 2 is coupled with the component 1 such that a relative movement between the bushing 2 and the component 1 is not possible.

The invention claimed is:

1. A bushing (2) configured for coupling with a component (1) and comprising a deformable member integrally formed on an end of the bushing (2) such that when the member is deformed, the member is configured to be in positive connection with the component (1) and prevent relative movement between the bushing (2) and the component (1), wherein the deformable member comprises a bifurcated end of the bushing (2) having a groove (22) formed in and opening toward an end face of the bushing (2) in a longitudinal direction thereof and between two protruding portions (23, 23') both extending in the longitudinal direction of the bushing (2).

2. The bushing (2) according to claim 1, wherein the bushing (2) includes a bushing body (20) and a head portion (21), which extends vertically from the bushing body (20).

3. The bushing according to claim 2, wherein the deformable member is formed integrally with the bushing body (20) or the head portion (21).

4. The bushing (2) according to claim 2, wherein the deformable member is provided at an end of the bushing body (20) facing away from the head portion (21).

5. The bushing (2) according to claim 3, wherein the deformable member is provided at an end of the bushing body (20) facing away from the head portion (21).

6. The bushing (2) according to claim 1, wherein one (23) of said two protruding portions (23, 23') is deformable to seat at an angle in a cutout (10) of the component (1).

7. The bushing (2) according to claim 2, wherein the head (21) extends perpendicularly to the longitudinally-extending opposite bifurcated end of the bushing (2).

8. The bushing (2) according to claim 7, wherein one (23) of said two protruding portions (23, 23') is deformable in the direction said head (21) extends to seat at an angle in a cutout (10) of the component (1).

\* \* \* \* \*